US010248184B2

(12) United States Patent
Sharma et al.

(10) Patent No.: US 10,248,184 B2
(45) Date of Patent: Apr. 2, 2019

(54) SENSOR API FRAMEWORK FOR CLOUD BASED APPLICATIONS

(75) Inventors: Piyush Sharma, San Diego, CA (US); Ashwin Swaminathan, San Diego, CA (US); Christopher Brunner, San Diego, CA (US); Murali R. Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1262 days.

(21) Appl. No.: 13/292,578

(22) Filed: Nov. 9, 2011

(65) Prior Publication Data
US 2013/0117769 A1  May 9, 2013

(51) Int. Cl.
| G06F 3/00 | (2006.01) |
| G06F 9/44 | (2018.01) |
| G06F 9/46 | (2006.01) |
| G06F 13/00 | (2006.01) |
| G06F 1/3293 | (2019.01) |
| H04W 52/02 | (2009.01) |

(Continued)

(52) U.S. Cl.
CPC ............ *G06F 1/3293* (2013.01); *G06F 9/541* (2013.01); *H04W 52/0274* (2013.01); *H04L 67/12* (2013.01); *H04M 2250/12* (2013.01); *H04W 52/0293* (2013.01); *Y02D 10/122* (2018.01); *Y02D 70/00* (2018.01); *Y02D 70/1262* (2018.01); *Y02D 70/142* (2018.01); *Y02D 70/144* (2018.01); *Y02D 70/164* (2018.01)

(58) Field of Classification Search
None
See application file for complete search history.

(56) References Cited

U.S. PATENT DOCUMENTS

| 2008/0076450 | A1 | 3/2008 | Nanda et al. |
| 2008/0184042 | A1 | 7/2008 | Parks et al. |
| 2008/0263196 | A1* | 10/2008 | Kansal et al. ................ 709/224 |

(Continued)

FOREIGN PATENT DOCUMENTS

| KR | 20060036833 A | 5/2006 |
| KR | 20090126724 A | 12/2009 |

(Continued)

OTHER PUBLICATIONS

Lockhart et al, Design Considerations for the MISDM Smart Phone-based Sensor Mining Architecture, ACM, Aug. 21 2011, 9 pages.*

(Continued)

*Primary Examiner* — Diem K Cao
(74) *Attorney, Agent, or Firm* — Silicon Valley Patent Group LLP (57) ABSTRACT

An apparatus and method for a framework exposing an API (application programming interface) to web-based server applications on the internet or in the cloud is presented. The API allows server applications to retrieve sensor data from a mobile device via a low-power sensor core processor on a mobile device. This API eliminates effort and cost associated with developing and promoting a new mobile device client application. The API framework includes APIs that web-based application may use to fetch sensor data from one or more particular sensors on the mobile device.

26 Claims, 7 Drawing Sheets

(51) Int. Cl.
 *G06F 9/54* (2006.01)
 *H04L 29/08* (2006.01)

(56) References Cited

U.S. PATENT DOCUMENTS

| | | | |
|---|---|---|---|
| 2009/0125918 A1* | 5/2009 | Kansal et al. | 719/328 |
| 2010/0214955 A1 | 8/2010 | Rune et al. | |
| 2010/0302028 A1 | 12/2010 | Desai et al. | |
| 2010/0313050 A1 | 12/2010 | Harrat et al. | |
| 2013/0007192 A1* | 1/2013 | Schmidt | H04L 67/025 709/217 |

FOREIGN PATENT DOCUMENTS

| | | | |
|---|---|---|---|
| WO | 2008039872 A2 | 4/2008 | |
| WO | WO-2009009197 A2 | 1/2009 | |
| WO | WO2010141878 A1 * | 9/2010 | H04M 1/725 |
| WO | 2010141878 | 12/2010 | |

OTHER PUBLICATIONS

Partial International Search Report—PCT/US2012/061142—ISA/EPO—dated Jan. 23, 2013.
Priyantha, et al., "Little Rock: Enabling Energy Efficient Continuous Sensing on Mobile Phones," IEEE Pervasive Computing, 2011, vol. 10, No. 2, pp. 1-12.
Baldauf M., et al., "A survey on context-aware systems", International Journal of Ad Hoc and Ubiquitous Computing. Inderscience Publishers. XX. vol. 2. No. 4. Jan. 1, 2007, pp. 263-277, XP002522218. ISSN: 1743-8225. DOI: 10.1504/IJAHUC.2007.014070.
International Search Report and Written Opinion—PCT/US2012/061142—ISA/EPO—dated Apr. 8, 2013.
Lane N.D., et al., "A survey of mobile phone sensing", IEEE Communications Magazine, Sep. 1, 2010, vol. 48, No. 9, IEEE Service Center, Piscataway, US, pp. 140-150, XP011317499, ISSN: 0163-6804.

* cited by examiner

SENSOR API FRAMEWORK FOR CLOUD BASED APPLICATIONS

CROSS-REFERENCE TO RELATED APPLICATIONS

Not Applicable.

BACKGROUND

I. Field of the Invention

This disclosure relates generally to apparatus and methods for wireless communications, and more particularly to providing sensor data from a mobile device to multiple web-based applications.

II. Background

Currently, web-based applications, sometimes called server applications, that require sensor data from a mobile device have a corresponding client application executing on the mobile device. Some of these client applications run on the mobile device continuously. With the wide variety of sensors being integrated into mobile devices and growing interest in the community to leverage sensor data in innovative ways, such client applications on the mobile device are increasing in popularity and use. These multiple client applications come from different sources, communicate with different servers, and may each consume large amounts of power and processing cycles from the mobile device. Unless these multiple client applications are from a common vendor, they are as a whole uncoordinated with each other and query the sensors randomly and redundantly. A sensor may be interrupted with overlapping requests when a single coordinated response would have sufficed. Additionally, web developers and researchers interested in mobile sensor data must write a separate client application for each server application and for each mobile device platform, thereby increasing development costs and prolonging development time. From a user's standpoint, the user needs to install multiple client applications for each of the different servers requesting sensor data and to recharge batteries more often.

Therefore, a platform should exist that reduces a number of client applications running on a mobile device, coordinate sensor requests, minimize or eliminate code development on the mobile device platform, and/or reduce power consumption in providing sensor data to server applications.

BRIEF SUMMARY

Disclosed is a mobile device and method running on a mobile device for providing a common API (application programming interface) that couples sensor data from one or more sensors to multiple server applications via a low duty cycle processor thereby offloading a high power consuming application processor.

According to some aspects, disclosed is a mobile device for providing a common API (application programming interface), the mobile device comprising: a modem coupled to a wireless antenna; a client application processor coupled to the modem, the client application processor, consuming a first level of power over a duration; a sensor core processor coupled to the modem and comprising the common API, wherein the sensor core processor comprises a sensor core client and a sensor driver coupled to the sensor core client, wherein the sensor core processor consumes a second level of power over the duration, and wherein the second level is lower than the first level of power; a sensor coupled to communicate with the sensor driver of the sensor core processor.

According to some aspects, disclosed is a method in a mobile device for providing a common API (application programming interface), the method comprising: receiving, from a first web-based server application, a first request for sensor data using the common API; receiving, from a second web-based server application unrelated to the first web-based server application, a second request for sensor data using the common API; processing the first request and the second request for sensor data on a sensor core processor and bypassing a client application processor; receiving, at the sensor core processor, sensor data from a sensor; replying to the first request with a first response comprising the sensor data; and replying to the second request for sensor data with a second response, separate from the first request, comprising the sensor data.

According to some aspects, disclosed is a mobile device for providing a common API (application programming interface) 170, the mobile device comprising: means for receiving, from a first web-based server application, a first request for sensor data using the common API; means for receiving, from a second web-based server application unrelated to the first web-based server application, a second request for sensor data using the common API; means for processing the first request and the second request for sensor data on a sensor core processor and bypassing a client application processor; means for receiving, at the sensor core processor, sensor data from a sensor; means for replying to the first request with a first response comprising the sensor data; and means for replying to the second request for sensor data with a second response, separate from the first request, comprising the sensor data.

According to some aspects, disclosed is a device comprising a processor and a memory wherein the memory includes software instructions for: receiving, from a first web-based server application, a first request for sensor data using a common API; receiving, from a second web-based server application unrelated to the first web-based server application, a second request for sensor data using the common API; processing the first request and the second request for sensor data on a sensor core processor and bypassing a client application processor; receiving, at the sensor core processor, sensor data from a sensor; replying to the first request with a first response comprising the sensor data; and replying to the second request for sensor data with a second response, separate from the first request, comprising the sensor data.

According to some aspects, disclosed is a non-transient computer-readable storage medium including program code stored thereon, comprising program code for: receiving, from a first web-based server application, a first request for sensor data using a common API; receiving, from a second web-based server application unrelated to the first web-based server application, a second request for sensor data using the common API; processing the first request and the second request for sensor data on a sensor core processor and bypassing a client application processor; receiving, at the sensor core processor, sensor data from a sensor; replying to the first request with a first response comprising the sensor data; and replying to the second request for sensor data with a second response, separate from the first request, comprising the sensor data.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

A mobile device described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device 100, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the internet, WiFi, or other network, and regardless of whether satellite signal reception, assistance data reception, and/or position-related processing occurs at the device, at a server, or at another device associated with the network. Any operable combination of the above are also considered a mobile device 100.

A cloud 300, which may be the public internet or a private internet, may be accessed through a wireless base station or access point having an internet gateway. A base station provides internet access through its data services offerings. Similarly, an access point provides internet access via a WiFi signal.

A framework exposing an API (application programming interface) to web-based server applications 200 on the internet or in the cloud 300 is presented. The API allows server applications 200 to retrieve sensor data from a mobile device 100 via a low-power sensor core processor on the mobile device 100. This API eliminates effort and cost associated with developing and promoting a new mobile device client application. The API framework includes APIs that web-based application may use to fetch sensor data from one or more particular sensors on the mobile device 100.

Instead of a web-based application sending a request for sensor data from a specific sensor or sensors on the mobile device 100, the mobile device 100 may receive an instruction via the API to trigger actions based on a certain condition (such as a threshold-based triggering, time-based triggering or a computation-based triggering). The web-based application may set up future triggers by having the mobile device 100 execute a customized script via the API. A web-based application may register (possibly requiring explicit permissions from the user) for either requesting immediate or periodic sensor data or may set up a future trigger for sensor data.

Figure 1:
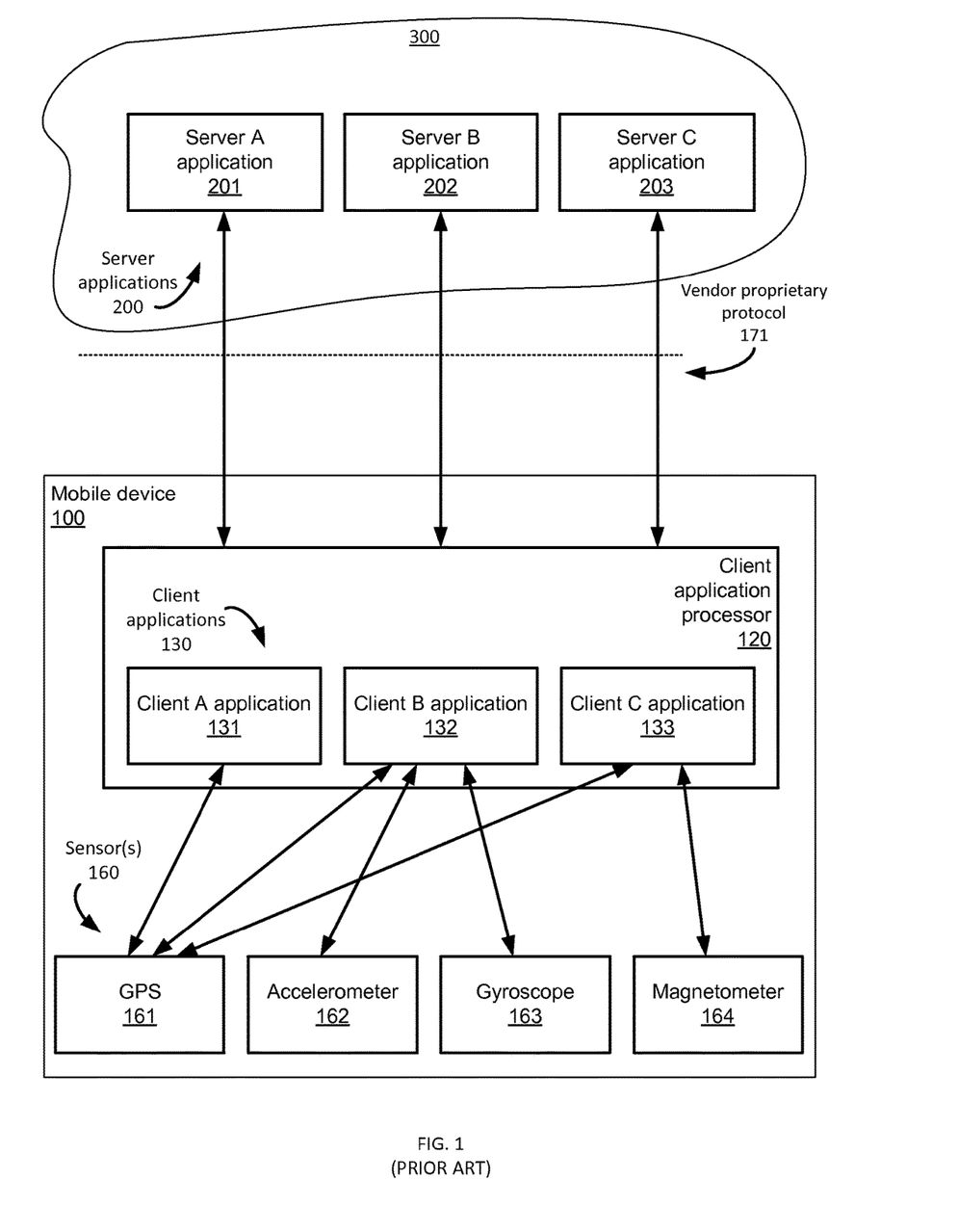
FIG. 1 shows components of a known system including server applications running in a cloud and dedicated client applications running on a client application processor of a mobile device.

FIG. 1 shows components of a known system including cloud-based applications and dedicated client applications 130 (e.g., 131, 132, 133) running on a client application processor 120 of a mobile device 100. The cloud-based applications are web-based remote server applications 200 (e.g., 201, 202, 203) running in the cloud 300. The client applications 130 communicate sensor data to the server applications 200 via a client application processor 120. Currently, to send sensor data from a particular sensor 160 (e.g., accelerometer 162) to server applications 200 (e.g., server B application 202), a mobile device 100 must continuously execute separate client applications 130 (e.g., client B application 132) for the server applications 200. Client applications 130 follows a vendor proprietary protocol 171 and consumes power while waiting for a request for sensor data from server applications 200. Because server applications 200 are unrelated to the other server applications 200, requests for sensor data are not coordinated.

Figure 2:
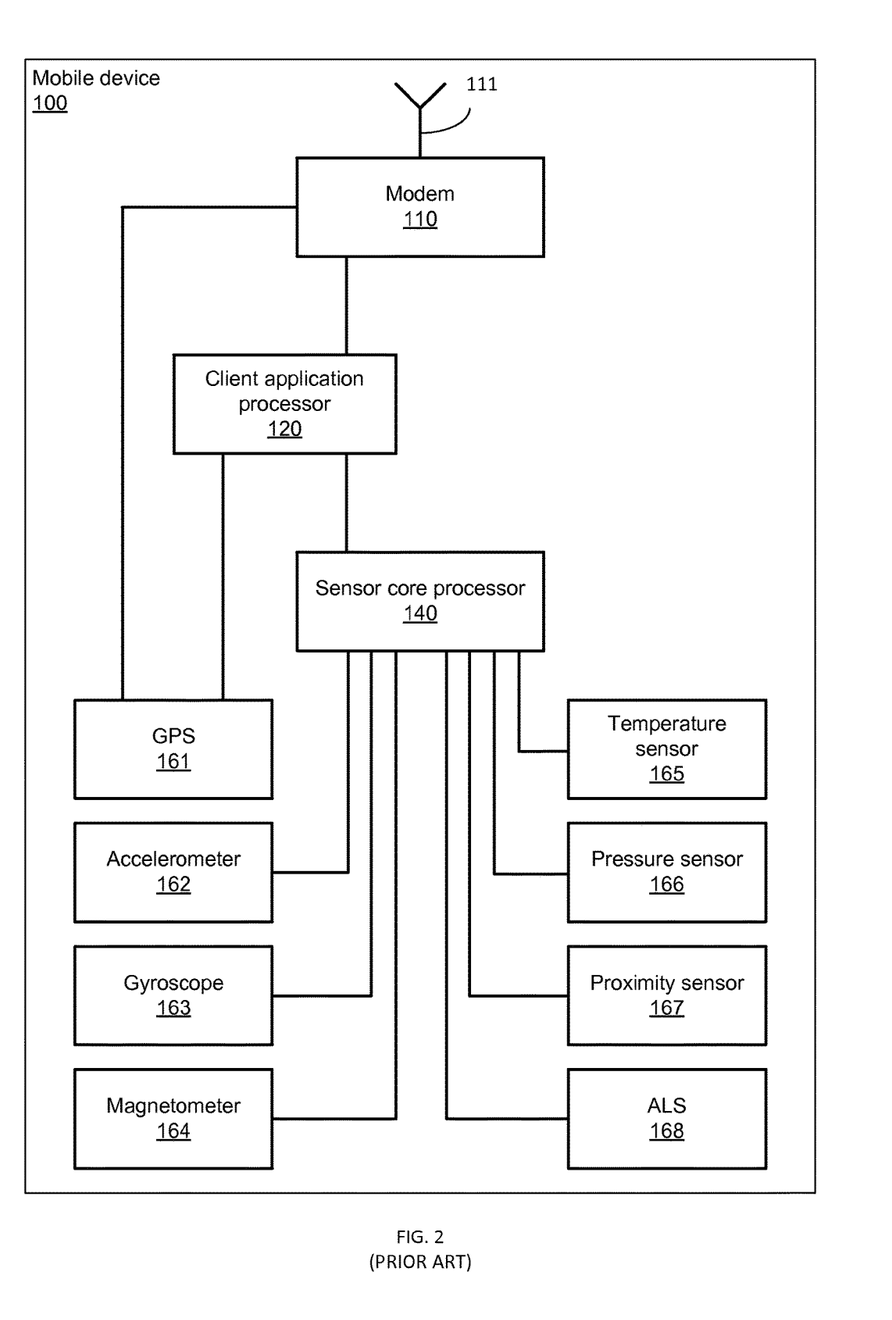
FIG. 2 shows components of a mobile device that provides sensor data via a client application processor.

FIG. 2 shows components of a mobile device 100 that provides sensor data via a client application processor 120. A mobile device 100 processes sensor data requests via dedicated client applications 130 (e.g., 131, 132, 133) running on a client application processor 120. Dedicated client applications 130 (e.g., 131, 132, 133) is required for the server applications 200 (e.g., 201, 202, 203).

For example, as shown in FIG. 1, client A application 131 and client B application 132 execute on a client application processor 120 and wait for a request from server A application 201 and server B application 202, respectively. Once a client application receives a request, it sends the request to a sensor core processor 140, which in turns polls or interrupts a particular sensor 160 or set of sensors (e.g., a global positioning satellite (GPS) receiver 161, an accelerometer 162, a gyroscope 163, a magnetometer 164, a temperature sensor 165, a pressure sensor 166, a proximity sensor 167 and/or an ambient light sensor (ALS 168) and the like). The particular sensor 160 or set of sensors may also include a microphone and/or a camera. Once the sensor core processor 140 responds to the client application with the sensor data, the client application responds to the original request with the sensor data. Therefore, the client application processor 120 is consuming power running various client applications 130 while it is waiting for new requests from its particular server application 200 and while it is waiting for sensor data.

Figure 3:
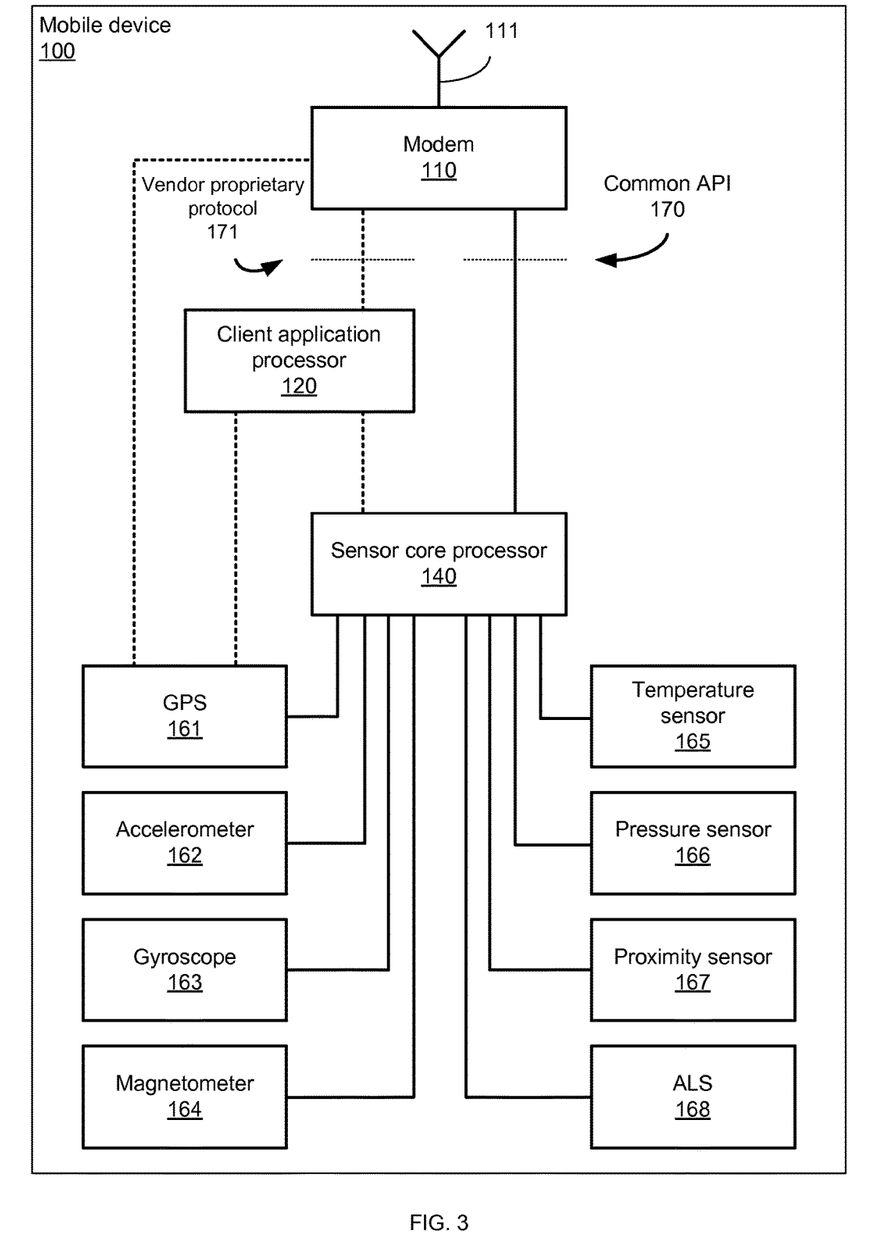
FIG. 3 shows components of a mobile device that provides sensor data using a sensor core processor and bypassing a client application processor, in accordance with some embodiments of the present invention.

FIG. 3 shows components of a mobile device 100 that provides sensor data using a sensor core processor 140 and bypassing a client application processor 120, in accordance with some embodiments of the present invention. The mobile device 100 operates with a common API 170 at the interface between the sensor core processor 140 and the server applications 200, which bypasses the client application processor 120. In some embodiments, the sensor core processor 140 operates in a low power mode. For example, the sensor core processor 140 may operate at a lower clock rate and/or have longer hibernation periods than the client application processor 120 or run on a lower grade processor. In this manner, the client application processor 120 is consuming a first level of power over a duration and the sensor core processor 140 is consuming a second level of power over the duration, where the second level of power is lower than the first level of power. The sensor core processor 140 executes a sensor core client 141, shown in FIG. 5, using the common API to communicate with various server applications 200. The sensor core client 141 acts as a means to receive requests for sensor data and a means for replying to the requests, each using a common API. The sensor core processor 140 also executes sensor drivers 150, shown in FIG. 5. The sensor drivers 150 may include a GPS driver 151, which acts as a means to communicate with the GPS receiver 161. The sensor drivers 150 may include an accelerometer driver 152, which acts as a means to communicate with the accelerometer 162. The sensor drivers 150 may include a gyroscope driver 153, which acts as a means to communicate with the gyroscope 163. The sensor drivers 150 may include a magnetometer driver 154, which acts as a means to communicate with the magnetometer 164. Similarly, the sensor drivers 150 may include a driver for each separate sensor, which acts as a means for receiving the sensor data from a sensor. The sensor drivers 150 are tailored to communicate with a specific hardware implementation of the respective sensors 160.

The sensor core processor 140 waits for requests from the server applications 200, which uses a common API request and is sent via the modem 110. The modem 110 is coupled to an air interface via a wireless antenna 111. The server applications 200 may push the request to the mobile device 100. The sensor core processor 140 may be less responsive than the client application processor 120, however, the sensor data reception at server applications 200 is often not time critical. Other client applications 130 requiring an immediate response may still be executed on the client application processor 120 but will not reduce power consumption as will client applications 130 running on the sensor core processor 140. In some embodiments, the sensor core processor 140 may execute lower computationally intensive applications while more computationally intensive applications are executed on the client application processor 120. This configuration enables trigger calculations and sensor data uploads to be done on the low power processor while leaving the power intensive application processor in a sleep mode.

Figure 4:
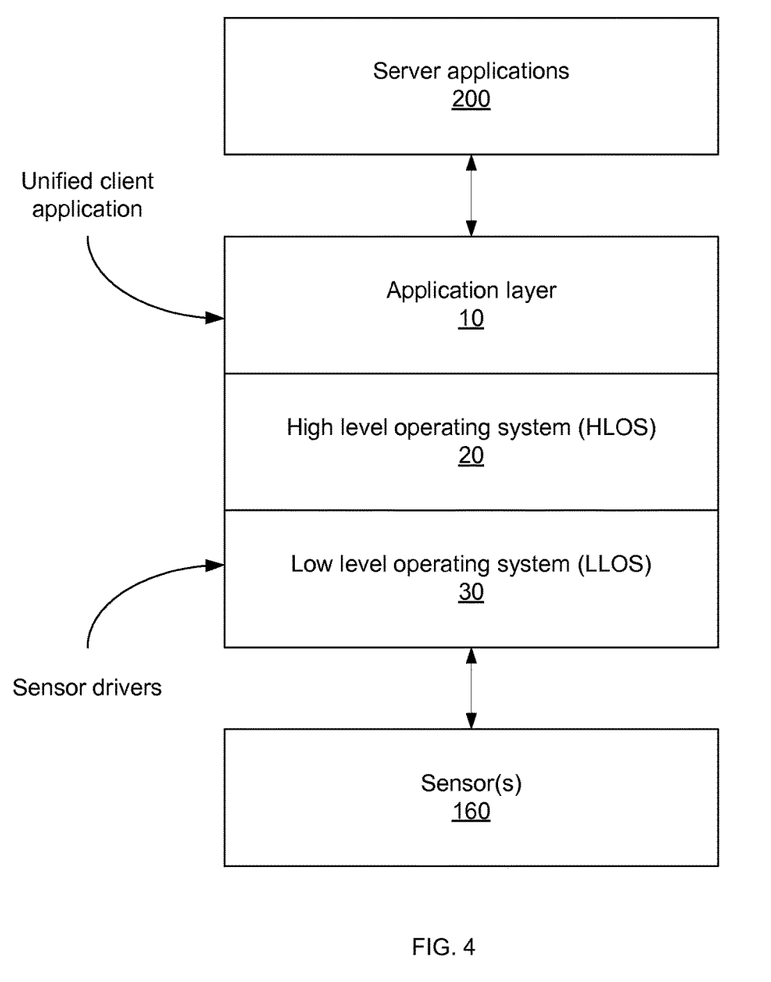
FIG. 4 shows an API framework, in accordance with some embodiments of the present invention.

FIG. 4 shows an API framework, in accordance with the present invention. The API framework includes an application layer 10, a high level operating system (HLOS 20), and a low level operating system (LLOS 30). This API framework promotes development of cloud-based mobile applications and provides simple web-based APIs to retrieve sensor information from a mobile device 100.

Server-based applications communicate with the top of API framework at the application layer 10. Sensors communicate with the API framework from below at the LLOS 30. The entire API framework runs on the low-power sensor core processor, such as sensor core processor 140, in the mobile device 100. A unified application runs at the application layer 10 and acts as a client by returning sensor data as requested by multiple uncoordinated, unassociated and unrelated cloud or web-based server applications 200.

Sensor drivers on the mobile device 100 reside below the application layer 10 and HLOS 20 and are under control of the LLOS 30. In some embodiments, a mobile device 100 includes sensor drivers 150 that are coupled to the LLOS 30. In other embodiments, the sensor drivers 150 are partially or completely part of the LLOS 30.

Figure 5:
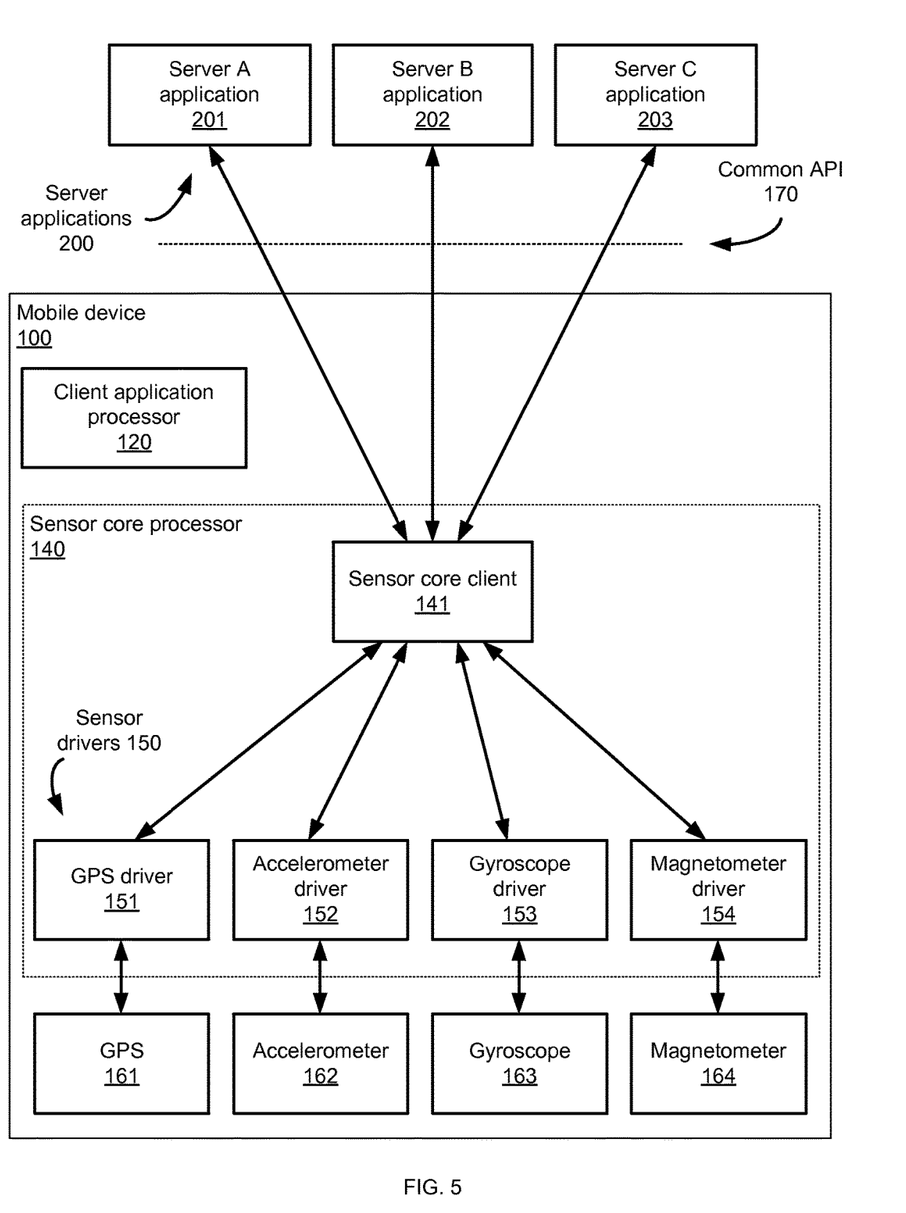
FIG. 5 shows components of a system including server applications running in a cloud and a dedicated sensor core client running on a sensor core processor of a mobile device.

FIG. 5 shows components of a system including server applications 200 (e.g., 201, 202, 203) running in the cloud 300 and a dedicated sensor core client 141 running on a sensor core processor 140 of a mobile device 100. The system communicates sensor data via separate sensor drivers 150 running on the sensor core processor 140. The sensor core client 141 may act as a means for processing requests for sensor data. The sensor core client 141 may coordinate overlapping or conflicting sensor data requests such that two separate requests for sensor data invoke a single call to sensor drivers 150. Thus, a sensor 160 is not interrupted with overlapping requests when a single coordinated response suffices.

The sensor core processor 140 receives requests from the modem 110 (shown in FIGS. 3 and 4) from separate and unrelated server applications 200 but with a common API 170. These requests may wait until the sensor core processor 140 cycles between an inactive period of a duty cycle (a sleep mode) to an active period of the duty cycle (an operational mode). A complete duty cycle includes one inactive period and one adjoining active period. Often, a duty-cycle operational mode that favors a sleep mode over an operational mode is a low-power duty-cycle mode. The sensor core processor 140 saves power by operating in a low-power duty-cycle mode. The sensor core client 141 uses the sensor drivers 150 to receive the sensor data from the sensors 160 and reports the sensor data back to the requesting server applications 200 via the common API 170. In this manner, the mobile device 100 provides the sensor data using the sensor core processor 140 and bypassing a client application processor 120.

Figure 6:
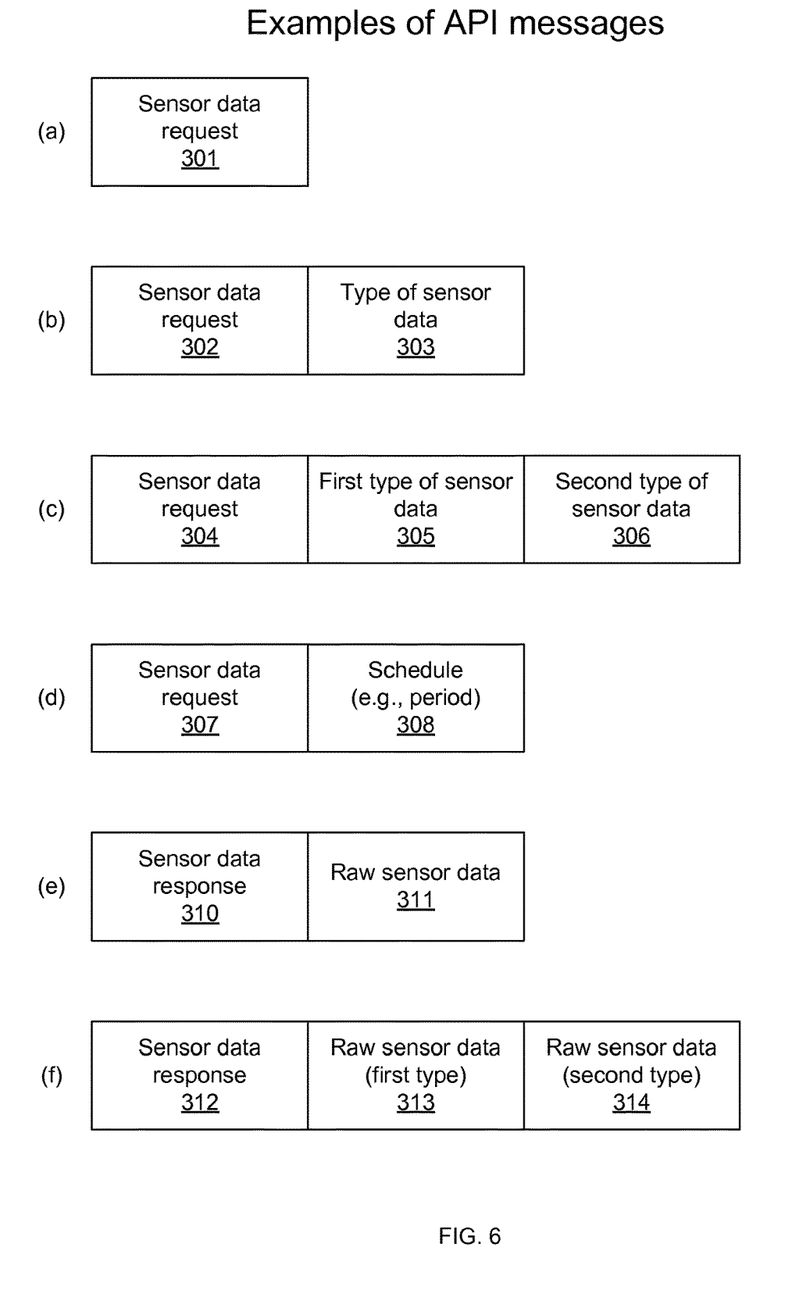
FIG. 6 illustrates various API messages, in accordance with some embodiments of the present invention.

FIG. 6 illustrates various API messages, in accordance with the present invention. Common API messages include both requests for sensor information and responses containing sensor data. A sensor data request contains a request for sensor data and an indication or address of where that data should be returned. Shown in (a), sensor data request 301 is a simple request for sensor data from a particular sensor and contains a return IP address. Shown in (b), sensor data request 302 is a request for sensor data from a variable sensor and contains a return IP address. Attached to sensor data request 302 is an indication of the type of sensor data 303. For example, the type of sensor data 303 may indicate data from an accelerometer. Shown in (c), sensor data request 304 is a request for sensor data from multiple sensors and contains a return IP address. Attached to sensor data request 304 is an indication of a first type of sensor data 305 and a second type of sensor data 306. Shown in (d), sensor data request 307 is a request for sensor data at a future time and contains a return IP address. Attached to sensor data request 307 is a schedule 308. For example, the schedule 308 may indicate that the sensor data is requested periodically and/or starting at a particular time. In response to the sensor data request, the unified client application may send a sensor data response. Shown in (e), sensor data response 310 corresponds to sensor data request 301, 302 or 307. Sensor data response 310 contains the indicated IP address as a destination address. Attached to sensor data response 310 is the raw sensor data 311. Alternatively, the unified client application may process the raw sensor data and return the processed sensor data. Shown in (f), sensor data response 312 corresponds to sensor data request 304. Sensor data response 312 contains the indicated IP address as a destination address. Attached to sensor data response 312 are the raw sensor data 313 from a first type of sensor and the raw sensor data 314 from a second type of sensor.

In some embodiments, the sensor data request includes instructions indicating a triggering calculation or triggering event. A triggering calculation may or may not be met. If a triggering condition is met, a trigger instructs the mobile device 100 to send data from one or more of its sensors as sensor data if one or more sensor measurements or sensor data from the same sensor and/or different sensors trigger a certain condition. For example, the mobile device 100 sends a sensor data response message including data from a first sensor (e.g., the GPS sensor showing a border has been crossed) based on data from a second sensor (e.g., the temperature sensor indicating a temperature passing lower than a certain amount). The triggering event may be location based. For example, when the GPS sensor shows a mobile device 100 is entering or exiting a certain boundary, the mobile device 100 may report its temperature.

The mobile device 100 may send measurements from multiple sensors based on a sensor triggering a certain criteria. The mobile device 100 may send measurements from a sensor based on a combination of measurements from multiple sensors triggering a certain criteria. The triggers may be a range or a certain value and may include a hysteresis to reduce duplicative reporting. For example, the mobile device 100 sends the GPS data based on when the temperature sensor shows temperature is outside a range for a certain about of time, the humidity sensor indicates humidity is greater that a certain value and the accelerometer 162 shows acceleration is below a set threshold.

Similarly, the mobile device 100 may send data from multiple or all sensors based on criteria begin met by multiple sensors. For example, the mobile device 100 may determine certain sensors indicate an emergency is occurring with a patient from biomedical sensors and then may report the emergency in the form of data from the biomedical sensors and the GPS sensor in a sensor data response message. Furthermore, some sensors may be included within the mobile device 100 itself while other sensors may be included in a personal area network (PAN) apart from but in communication with the mobile device 100.

A triggering calculation may be triggered by one or more sensors. A triggering calculation may also be triggered by or conditioned on a timer or absolute time. For example, a sensor may report its data after conditions are met and a certain about of time has passed from a previous event, such as a previous reporting. A mobile device 100 may periodically check (e.g., every 30 minutes) if certain sensor conditions are met and if so, report sensor data. A mobile device 100 may check according to a schedule (e.g., every day at 8 AM, noon and 5 PM) whether certain sensor conditions are met and if so, report sensor data.

Figure 7:
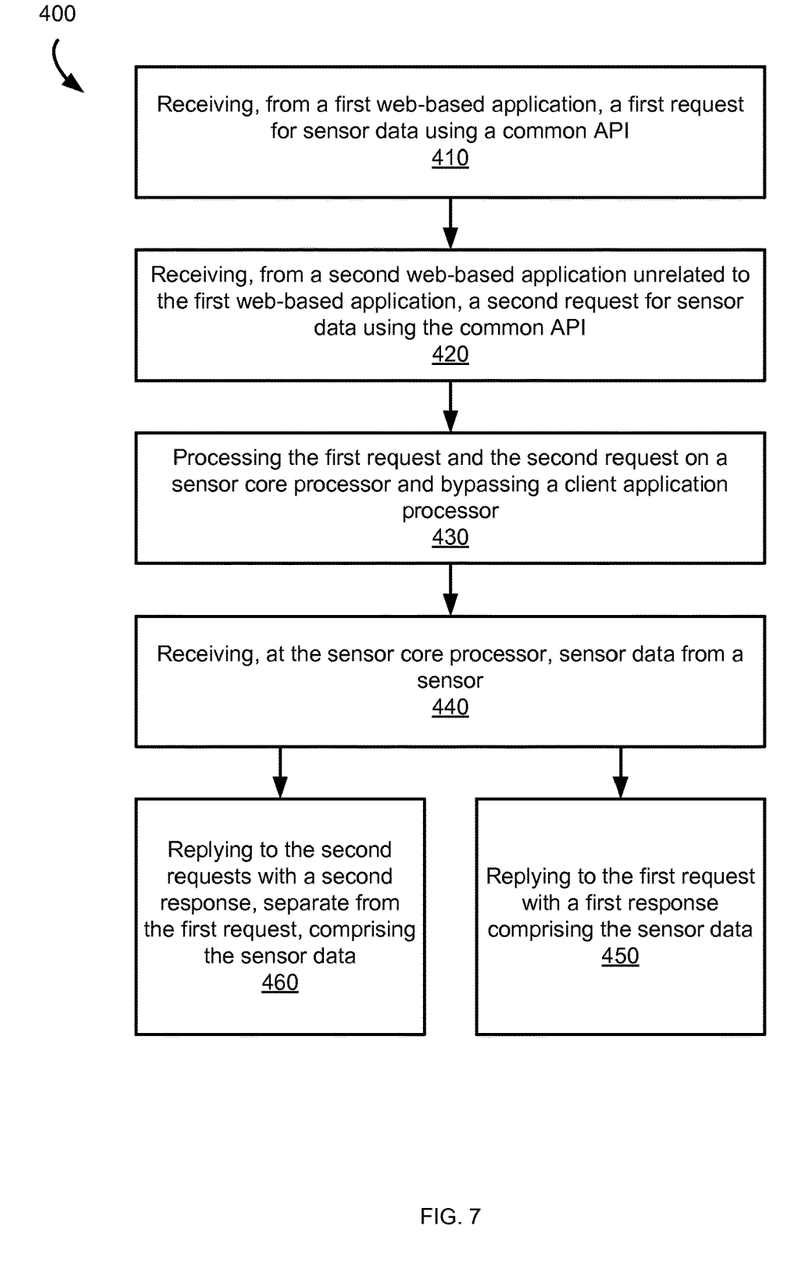
FIG. 7 shows a flow diagram, in accordance with some embodiments of the present invention.

FIG. 7 shows a flow diagram 400, in accordance with some embodiments of the present invention. The method is executed in a mobile device 100 and provides a common API 170 to multiple server applications 200. At step 410, a mobile device 100 receives, from a first web-based application (e.g., server application 201), a first request for sensor data using the common API 170. At step 420, the mobile device 100 receives, from a second web-based application (e.g., server B application 202) unrelated to the first web-based application, a second request for sensor data also uses the common API 170.

At step 430, the mobile device 100 processes the first request and the second request for sensor data on a sensor core processor 140 using a sensor core client 141 and bypasses a client application processor 120. At step 440, the mobile device 100 receives, at the sensor core processor, sensor data from a sensor. At step 450, the mobile device 100 replies to the first request with a first response comprising the sensor data and bypasses the client application processor 120. At step 460, the mobile device 100 replies to the second request for sensor data with a second response. The second response is separate from the first request and comprises the sensor data and also bypasses the client application processor 120. Step 450 and step 460 may occur independently, sequentially or overlapping from one another.

The methodologies described herein may be implemented by various means depending upon the application. For example, these methodologies may be implemented in hardware, firmware instructions, software instructions, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transient computer-readable storage medium, such as memory, and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for providing a common API (application programming interface), the method comprising:
   receiving, at the mobile device and from a first web-based server application, a first request for sensor data using the common API;
   receiving, at the mobile device and from a second web-based server application unrelated to the first web-based server application, a second request for sensor data using the common API, wherein the first request for sensor data and the second request for sensor data are wirelessly received from different servers using the common API;
   processing, in the mobile device, the first request for sensor data and the second request for sensor data on a sensor core processor and bypassing a client application processor in the mobile device;
   receiving, at the sensor core processor, sensor data from a sensor;
   replying, from the mobile device, to the first request for sensor data with a first response comprising the sensor data; and
   replying, from the mobile device, to the second request for sensor data with a second response, separate from the first response, comprising the sensor data, wherein the first response comprising the sensor data and the second response comprising the sensor data are wirelessly sent to the different servers using the common API.

2. The method of claim 1, wherein the first request for sensor data comprises an indication of a triggering event.

3. The method of claim 2, wherein the triggering event comprises a certain condition from a second sensor providing data separate from the sensor data.

4. The method of claim 1, further comprising executing a sensor core client on the sensor core processor.

5. The method of claim 1, wherein the sensor data from the sensor comprises sensor data from a plurality of sensors.

6. The method of claim 5, wherein the sensor comprises a global positioning satellite (GPS) receiver.

7. The method of claim 5, wherein the plurality of sensors comprises:
an accelerometer; and
a gyroscope.

8. The method of claim 5, wherein the sensor comprises a magnetometer.

9. The method of claim 5, wherein the sensor comprises a pressure sensor.

10. The method of claim 5, wherein the sensor comprises a proximity sensor.

11. The method of claim 5, wherein the sensor comprises an ambient light sensor (ALS).

12. The method of claim 5, wherein the sensor comprises a microphone.

13. The method of claim 5, wherein the sensor comprises a camera.

14. The method of claim 5, further comprising executing a sensor core client on the sensor core processor for each of the plurality of sensors.

15. The method of claim 1, further comprising:
receiving, at the mobile device and from a third web-based server application, a third request for sensor data that is time critical, the third request for sensor data is wirelessly received from a server using a protocol that is not the common API;
processing, in the mobile device, the third request for sensor data on the client application processor;
receiving, at the client application processor, sensor data from at least one sensor;
replying, from the mobile device, to the third request for sensor data with a third response comprising the sensor data from the at least one sensor.

16. A mobile device for providing a common API (application programming interface), the mobile device comprising:
means for receiving, at the mobile device and from a first web-based server application, a first request for sensor data using the common API;
means for receiving, at the mobile device and from a second web-based server application unrelated to the first web-based server application, a second request for sensor data using the common API, wherein the first request for sensor data and the second request for sensor data are wirelessly received from different servers using the common API;
means for processing, in the mobile device, the first request for sensor data and the second request for sensor data and bypassing a client application processor in the mobile device;
means for receiving, in the mobile device, sensor data from a sensor;
means for replying, from the mobile device, to the first request for sensor data with a first response comprising the sensor data; and
means for replying, from the mobile device, to the second request for sensor data with a second response, separate from the first response, comprising the sensor data, wherein the first response comprising the sensor data and the second response comprising the sensor data are wirelessly sent to the different servers using the common API.

17. A mobile device comprising a processor and a memory wherein the memory includes software instructions for:
receiving, at the mobile device and from a first web-based server application, a first request for sensor data using a common API (application programming interface);
receiving, at the mobile device and from a second web-based server application unrelated to the first web-based server application, a second request for sensor data using the common API, wherein the first request for sensor data and the second request for sensor data are wirelessly received from different servers using the common API;
processing, in the mobile device, the first request for sensor data and the second request for sensor data on a sensor core processor and bypassing a client application processor in the mobile device;
receiving, at the sensor core processor, sensor data from a sensor;
replying, from the mobile device, to the first request for sensor data with a first response comprising the sensor data; and
replying, from the mobile device, to the second request for sensor data with a second response, separate from the first response, comprising the sensor data, wherein the first response comprising the sensor data and the second response comprising the sensor data are wirelessly sent to the different servers using the common API.

18. A non-transient computer-readable storage medium including program code stored thereon for a mobile device to provide a common API (application programming interface), comprising program code for:
receiving, at the mobile device and from a first web-based server application, a first request for sensor data using the common API;
receiving, at the mobile device and from a second web-based server application unrelated to the first web-based server application, a second request for sensor data using the common API, wherein the first request for sensor data and the second request for sensor data are wirelessly received from different servers using the common API;
processing, in the mobile device, the first request for sensor data and the second request for sensor data on a sensor core processor and bypassing a client application processor in the mobile device;
receiving, at the sensor core processor, sensor data from a sensor;
replying, from the mobile device, to the first request for sensor data with a first response comprising the sensor data; and
replying, from the mobile device, to the second request for sensor data with a second response, separate from the first response, comprising the sensor data, wherein the first response comprising the sensor data and the second response comprising the sensor data are wirelessly sent to the different servers using the common API.

19. A mobile device for providing a common API (application programming interface), the mobile device comprising:
a modem coupled to a wireless antenna;
at least one sensor;

a client application processor coupled to the modem and the at least one sensor;
a sensor core processor coupled to the modem and the at least one sensor, wherein the sensor core processor is configured to:
   receive via the modem and from a first web-based server application, a first request for sensor data using the common API;
   receive via the modem and from a second web-based server application unrelated to the first web-based server application, a second request for sensor data using the common API, wherein the first request for sensor data and the second request for sensor data are wirelessly received from different servers using the common API;
   process the first request for sensor data and the second request for sensor data, wherein the first request for sensor data and the second request for sensor data bypass the client application;
   receive sensor data from a first sensor;
   reply to the first request for sensor data via the modem with a first response comprising the sensor data; and
   reply to the second request for sensor data via the modem with a second response, separate from the first response, comprising the sensor data, wherein the first response comprising the sensor data and the second response comprising the sensor data are wirelessly sent to the different servers using the common API.

20. The mobile device of claim 19, wherein the first request for sensor data comprises an indication of a triggering event.

21. The mobile device of claim 20, wherein the triggering event comprises a certain condition from a second sensor providing data separate from the sensor data.

22. The mobile device of claim 19, wherein the sensor core processor comprises a sensor core client.

23. The mobile device of claim 19, further comprising a plurality of sensors, wherein the sensor data from the first sensor comprises sensor data from the plurality of sensors.

24. The mobile device of claim 23, wherein the plurality of sensors comprises one or more of a global positioning satellite (GPS) receiver, an accelerometer, a gyroscope, a magnetometer, a pressure sensor, a proximity sensor, an ambient light sensor (ALS), a microphone, and a camera.

25. The mobile device of claim 23, wherein the sensor core processor comprises a plurality of sensor core clients corresponding to the plurality of sensors.

26. The mobile device of claim 19, wherein the client application processor is configured to:
   receive via the modem a third request for sensor data that is time critical the third request for sensor data is wirelessly received from a server using a protocol that is not the common API;
   process the third request for sensor data;
   receive sensor data from the at least one sensor;
   reply to the third request for sensor data via the modem with a third response comprising the sensor data from the at least one sensor.

* * * * *